United States Patent [19]

Maine et al.

[11] Patent Number: 5,368,669

[45] Date of Patent: Nov. 29, 1994

[54] METHOD OF LINING A PIPELINE

[75] Inventors: Leslie Maine, Cramlington; Trevor G. Stafford, Whitley Bay, both of United Kingdom

[73] Assignee: British Gas plc, London, England

[21] Appl. No.: 5,084

[22] Filed: Jan. 15, 1993

[30] Foreign Application Priority Data

Feb. 27, 1992 [GB] United Kingdom ............... 9204150.8

[51] Int. Cl.⁵ ..................... B29C 63/42; B29C 65/14; B29C 65/18
[52] U.S. Cl. ..................... 156/158; 138/109; 156/165; 156/272.2; 156/273.9; 156/294; 264/230; 264/269; 285/21; 285/55; 285/363
[58] Field of Search ............... 156/86, 158, 165, 182, 156/273.9, 274.2, 287, 294, 304.2, 304.6, 272.2; 138/109; 264/25, 230, 269; 285/21, 55, 363, 405

[56] References Cited

U.S. PATENT DOCUMENTS

| | | | |
|---|---|---|---|
| 3,080,269 | 3/1963 | Pollock et al. | 156/287 |
| 3,228,096 | 1/1966 | Albro | 285/55 |
| 3,702,199 | 11/1972 | Brooks et al. | 285/55 |
| 3,972,548 | 8/1976 | Roseen | 156/304.2 |
| 4,070,044 | 1/1978 | Carrow | 156/86 |
| 4,281,859 | 8/1981 | Davies | 285/363 |
| 4,484,770 | 11/1984 | Sloane | 285/55 |
| 4,538,837 | 9/1985 | Cronk | 285/55 |
| 4,699,821 | 10/1987 | Hallock | 156/86 |
| 4,758,302 | 7/1988 | Hannover | 156/294 |
| 4,773,452 | 9/1988 | Dotti et al. | 138/109 |
| 5,127,116 | 7/1992 | Greig | 285/55 |
| 5,171,041 | 12/1992 | McMillan et al. | 285/21 |
| 5,196,106 | 3/1993 | Du Pree et al. | 205/67 |
| 5,296,073 | 3/1994 | Stafford et al. | 156/272.2 |

FOREIGN PATENT DOCUMENTS

| | | |
|---|---|---|
| 0065886 | 12/1982 | European Pat. Off. . |
| 0122246 | 10/1984 | European Pat. Off. . |
| 0254489 | 1/1988 | European Pat. Off. . |
| 0298125 | 1/1989 | European Pat. Off. . |
| 0369998 | 5/1990 | European Pat. Off. . |
| 0377486 | 7/1990 | European Pat. Off. . |
| 3519439 | 5/1985 | Germany ............... 264/269 |
| 55-103920 | 8/1980 | Japan . |
| 2084686 | 4/1982 | United Kingdom . |
| 2181208 | 4/1987 | United Kingdom . |
| 2216459 | 10/1989 | United Kingdom ............... 156/304.2 |
| 2218490 | 11/1989 | United Kingdom . |
| 4226 | 7/1987 | WIPO ............... 156/294 |

*Primary Examiner*—Michael Ball
*Assistant Examiner*—Steven D. Maki
*Attorney, Agent, or Firm*—Larson and Taylor

[57] ABSTRACT

A method of lining a pipeline 24 intended to carry gas, oil, water, sewage or chemicals in which a cross-linked polymeric liner pipe 10, which has been reduced from its original diameter to a lesser diameter or to a shape of reduced maximum dimension, is pulled through the pipeline 24. The lesser diameter is less than the least inner diameter of the pipeline 24. After the liner pipe 10 has been fully pulled through, the pipe liner 10 is heated by means of a source 60 of visible or infrared radiation forming part of a pig assembly 50 to cause it to revert to the pipeline. The pig assembly or assemblies are stationary at zones 70 where service connections are to be made. Subsequently, the remaining liner pipe 10 is reverted by pulling the source 60 through the liner pipe 10.

4 Claims, 4 Drawing Sheets

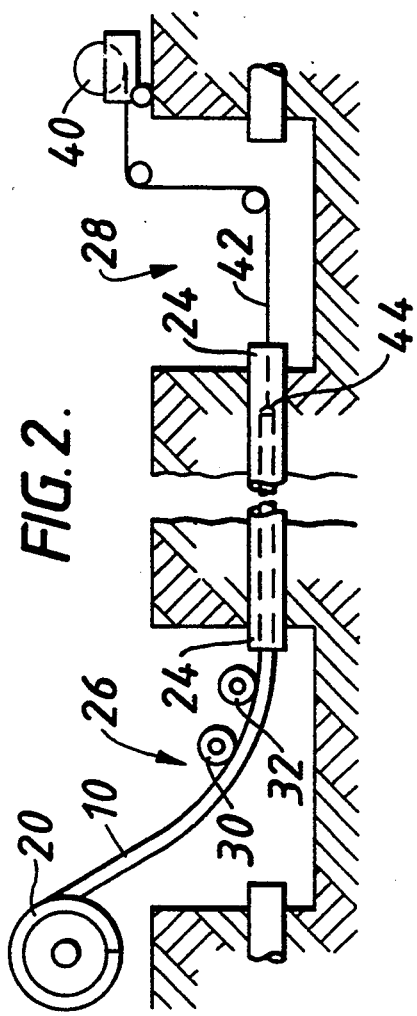
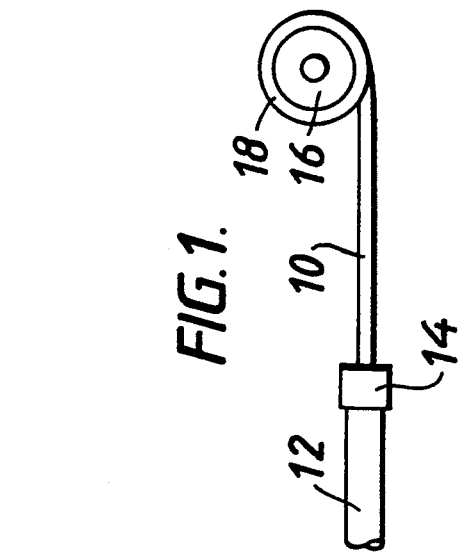
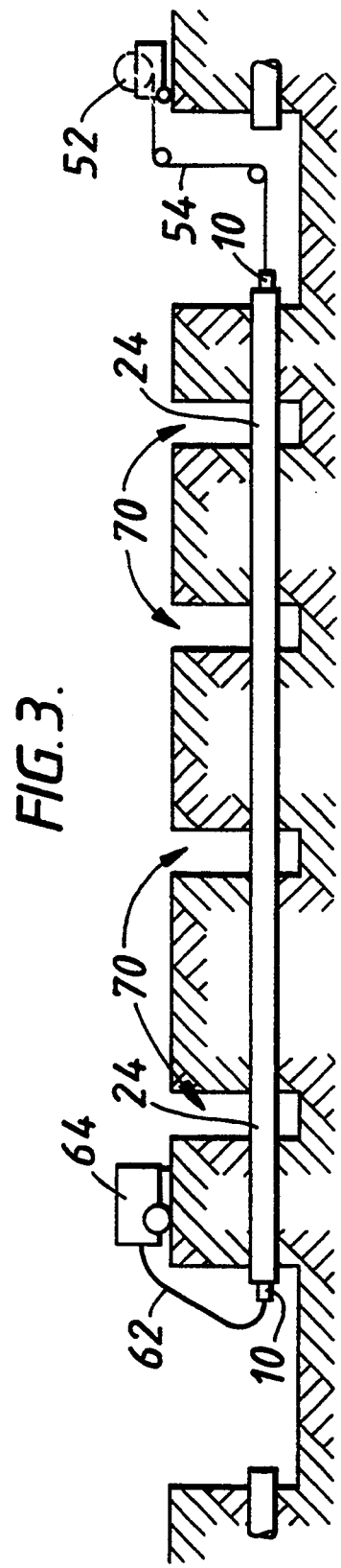

METHOD OF LINING A PIPELINE

The invention relates to methods of lining a pipeline.

Gas and water pipelines may be lined using the invention, for example, and other pipelines such as sewerage and chemical and process pipelines may also be lined using the invention. The invention is applicable to installed pipelines which are commonly buried, for example, in the case of gas, water and sewerage lines. However, such lines may run at least in part overground and chemical and process lines may not be buried at all.

Australian patent application No. 22334/70 (Dunlop Australia Limited) describes a factory process for lining lengths of aluminium tubing in which a tube of polyethylene is extruded from a die and simultaneously cross-linked through the agency of organic peroxides and the influence of heat. During extrusion the tube of polyethylene is drawn by a haul-off at a greater rate than the exit of the polyethylene from the die orifice. The polyethylene is consequently reduced in diameter and thickness whilst increased in length and is cooled so that the reduced diameter is preserved until subsequently used.

The lengths of aluminium tubing are loaded internally with lengths of the polyethylene tube having the reduced diameter. The composite tube is passed on a conveyor through a heating tunnel so that heat is applied progressively from one end to the other. The polyethylene contracts lengthwise and expands radially uniformly and ultimately is said to fit snugly against the bore of the aluminium tube. During heat treatment hot circulating gas is used.

British patent No. 1462815 (Pont-a-Mousson SA) describes a factory process in which polyethylene tube is cross-linked and extruded so as to reduce the diameter and cooled. Metal plates are pressed into engagement with the tube and the assembly is then heated apparently by conduction of heat from two external heaters which clamp the plates between them. The polyethylene expands and so achieves a tight fit between the plates, the assembly so produced being used as a heat exchanger.

European patent application No. EP-82400589.6 publication No. 0065886 describes a system for lining pipelines up to 2 km long. Cross-linked polyethylene, for example, is used as a liner. The polyethylene tube is extruded and cross-linked. The tube is heated and deformed radially to a folded shape, for example a U-shape, by passing the liner tube though a cold die. The liner is passed into the pipeline to be lined and heated to 140° C. for example. The liner tube returns to the cylindrical shape which it had before it was deformed to a U-shape. The liner tube is thus claimed to be able to revert to a close fit in the pipeline.

In the above prior published specifications, only EP-0065886 describes a system which is applicable to use in the field i.e. to line pipes which are already in their installed, for example buried, condition. None of the prior publications discloses a mechanism for heating the liner tube (when it is in the pipeline) which can travel along the liner tube and heat it selectively.

According to the invention a method of lining a pipeline comprises inserting into the pipeline a cross-linked polymeric liner pipe which has been reduced from its original diameter to a lesser diameter or to a shape of reduced maximum dimension and which has a predisposition by virtue of its memory to revert upon heating towards said original diameter, said lesser diameter being less than the least inner diameter of the pipeline, and heating the liner pipe to cause the liner pipe to revert towards said original diameter characterised in that said heating is caused by a source of visible or infrared radiation.

Embodiments of the invention will now be described by way of example with reference to the accompanying drawings, in which:

FIG. 1 shows the initial stage of reduction in diameter of the liner pipe;

FIG. 2 shows the method in general as used in the field;

FIG. 3 shows the method in which service connections are required at intervals along the pipeline;

Figure 4:
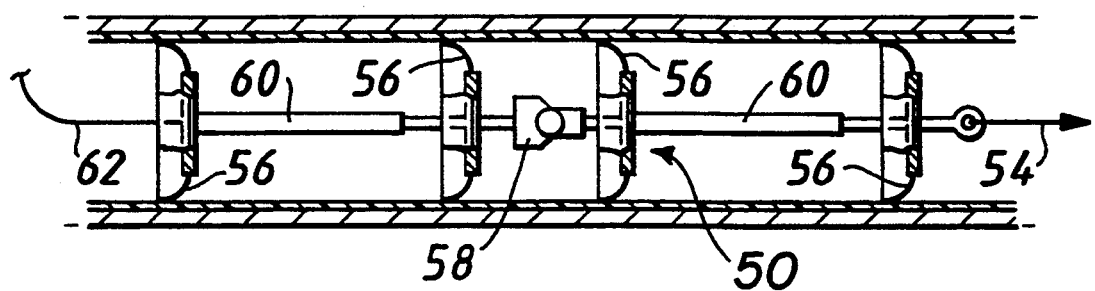
FIG. 4 shows one form of source of radiation.

FIG. 1 shows the production stage of the lower pipe 10 which is made from cross-linked plastics material, for example cross-linked polyethylene. The liner pipe 10 is extruded in an extruder 12. The final stage of production includes the step of reducing the pipe from its original diameter to a lesser diameter. This step may involve the use of a die 14 through which the pipe 10 is passed, before the pipe is wound onto a former 16 to produce a coil 18 of pipe 10, as shown.

Alternatively, the step of reducing the diameter may involve the use of rollers arranged to reduce the diameter and between which the pipe 10 passes.

The production stage includes the steps of reducing the liner pipe 10 while the pipe is at an elevated temperature, preferably above its crystalline melting point and then cooling the pipe so that the pipe has a predisposition by virtue of its elastic memory to revert upon heating to a temperature above its crystalline melting point towards its original diameter. The crystalline melting point, in the case of polyethylene, is approximately 140° C.

The liner pipe 10 is produced in sizes to provide an easy, clearance fit in the host pipeline which is to be lined. The liner pipe 10 is delivered to the site in coils 20 (FIG. 2). Typical nominal bores for pipelines handling natural gas are 3-inch (77 millimeter), 4-inch (102 mm) and 6-inch (153 mm). Typically, liner pipe having a standard dimension ratio i.e. the ratio of outside diameter to the wall thickness (SDR) of 17 or 26 is used for natural gas and for gravity sewerage, while for water the SDR is typically 17.

Figure 10:
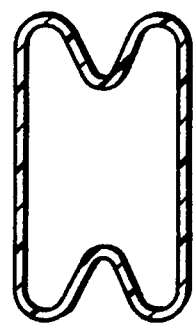

One example of producing liner pipe, assuming that it is required to line a 4-inch gas pipeline, will now be described. It will be further assumed that the liner pipe has a circular cross-section as shown in FIG. 10. A standard size of liner pipe is reduced in diameter from 110 millimeters to 80 mm. The deformation introduced into the liner pipe at this stage is over 27% and the maximum clearance in the bore of the pipeline is of the order of 20 mm preferably to allow the liner pipe to pass, with clearance, the inevitable protruding plugs 22 or ends of T fittings (FIGS. 6 and 7).

Figure 8:
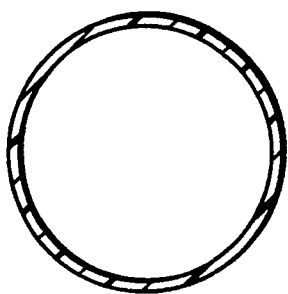
FIGS. 8 to 10 show forms of cross-section of the liner pipe when reduced from its original diameter.
Figure 9:
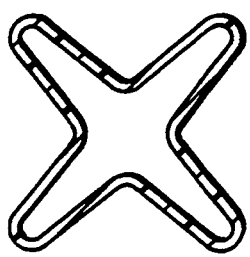

Alternatively, the liner pipe is not deformed to preserve its circular shape but instead it is deformed, preferably at the factory, to a shape of reduced maximum dimension, for example to one of the shapes shown in FIGS. 8 or 9. The pipe is preferably deformed while hot, preferably at a temperature above its crystalline melting point. The pipe is preferably then cooled.

The deformed pipe is preferably one affording an open shape to allow entry of the pig or pig assembly referred to below. It may be necessary to conduct a preliminary stage of opening the pipe by means of a mechanical member which is pulled through the pipe, for example, before the heating assembly enters the pipe.

Figure 6:
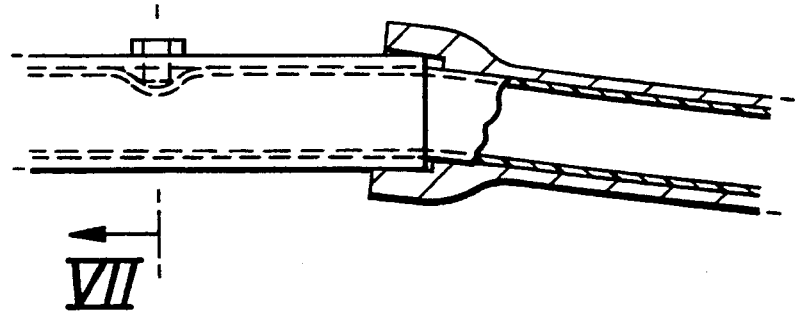
FIG. 6 shows a detail of a joint in the pipeline.
Figure 7:
FIG. 7 shows a cross-section on the line VII—VII in FIG. 6.

Another cause of obstruction in the bore of the pipeline is a bend usually formed by an angled joint between pipe lengths, which is also shown in FIG. 6. The liner pipe 10 must, in bending, adopt a slightly flattened shape with corresponding sideways dilation. There is usually a slight step within the bore of the pipeline at the joint which must be negotiated.

The liner pipe 10 is pulled completely through the host pipeline 24 having ends exposed at excavations 26, 28. A guide roller is positioned at 30 supported by a trunnion resting on the base of the excavation 26 or alternatively at 32 supported by a bracket carried by the end of the pipeline 24. This is standard practice as adopted when the pipeline is to be lined using the well known slip-lining method.

A winch 40 at the other end of the pipeline 24 pulls a wire 42 attached to a nosecone 44 secured to the leading end of the liner pipe 10.

When the liner pipe 10 has been fully pulled through with a length of liner pipe 10 protruding from the exit end of the pipeline 24, pulling is discontinued and the nosecone 44 is disconnected from the liner pipe 10. The liner pipe 10 is severed near the entrance end of the pipeline 24 to leave a length of liner pipe 10 protruding from the entrance end of the pipeline.

The next stage is heating of the installed liner pipe 10 to cause it to revert towards the pipeline 24. FIG. 4 shows a pig assembly 50 which is installed in the liner pipe 10 and connected to a winch 52 by a wire 54. The pig assembly 50 comprises one or more pies supported by flexible cups 56 and, if more than one pig is used, with an articulated connection 58 between adjacent pigs. A lamp 60 or other suitable source of visible or infrared radiation is carried centrally of the liner pipe 10 by the flexible cups 56 of the, or each, pig. The lamp (s) 60, and or other source, is connected to a power cable 62 which leads downstream of the pig assembly 50, out of the downstream end of the liner pipe 10 and is connected to an electrical generator 64.

The source or sources heat the liner pipe 10 to above its crystalline melting point, so that the liner pipe 10 reverts to the original diameter, or towards a diameter close to that value, as far as is allowed by the inner wall of the pipeline. The original diameter is that given to the liner pipe 10 by the production stage of the pipe as referred to earlier in this specification. At temperatures above the melt crystallisation temperature the cross-linked polyethylene material has sufficient strength to support the heating source at locations where the external pipe has been removed.

If no connections are required along the length of pipeline 24, the pig assembly 50 may be pulled through the liner pipe 10 at a constant rate of, say, ½ meter per minute.

Where, as is more likely, service connections are required, excavations 70 are made, the outer pipe removed, and the liner pipe 10 is reverted at these zones first. Then, while the liner pipe 10 cools down in these zones, the remaining lengths of liner pipe 10 are reverted. It is possible to arrange for a pig assembly 50 to be placed at each zone, or at several zones, during reversion of the pipe liner 10 in those zones.

This improves productivity and allows service connections to be made whilst the remainder of the pipeline is being reverted.

Figure 5:
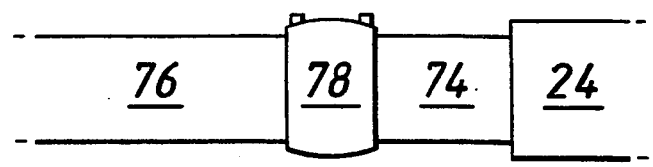
FIG. 5 shows details of the lower pipe protruding from one end of the pipeline and a fitting connected to the end of the liner pipe.

When reversion has been completed, the lengths of liner pipe 10 are connected to one another to make the completed line of pipe. As shown in FIG. 5, the length of liner pipe 74 protruding from one length of pipeline 24 can be joined to an adjacent length of liner pipe 76 protruding from another length of pipeline (not shown) by an electrofusion coupler 78. The lengths 74, 76 are displaced sideways to allow the coupler 78 to be pushed over the length 74, say. The coupler 78 is pushed right onto the length 74 to allow the length 76 to be positioned in line with the length 74. Then, the coupler 78 is pushed back over the join between the two lengths 74, 76 so as to bridge the join symmetrically. The coupler 78 can then be fusion joined to the lengths 74, 76 so that a continuous liner results.

Instead of the length 76 protruding from a lined pipeline, the length 76 may be a length of polyethylene, either non-crosslinked or crosslinked. This is joined to the length 74 as described. Then, the remote end of the length 76 is joined by a second electrofusion coupler to, say, the protruding end of a liner pipe extending from a further length of pipeline.

Alternatively, the length 76 may be a length of non-crosslinked or crosslinked polyethylene with a mechanical fitting secured to its left-hand end. The mechanical fitting includes a flange to enable the pipe liner to be connected to a metal pipeline.

The description given so far has assumed that the liner pipe 10 has a circular cross-section. Although that is the preferred cross-section, other cross-sections may be used. The initial production stage may comprise mechanism which produces the final reduced shape in the form shown in FIGS. 8 to 9.

After a liner pipe 10 having a cross-section as shown in one of FIGS. 8 of 9 has been installed in the pipeline 24, it would be necessary to seal the ends of the liner pipe 10 and then to inject air or other fluid into the liner to "pop" the pipe liner 10 into a circular or near circular cross-section. Following this, the pig assembly 50 would be traversed through the pipe liner 10 to complete the reversion stage using the source of radiation, either visible or infrared, as the source of heat.

Alternatively, whether the liner pipe 10 is subjected to pneumatic pressure or not, the pig assembly 50 may comprise a pig or pigs having flexible cups 56 or having an external cross-sectional outline which is, or are, shaped so as to change the cross-sectional shape of the pipe liner 10 to a circular or a near circular form. A subsequent pig or pigs (in the assembly 50 may have an external cross-sectional shape, or have flexible cups, which further approach a circular shape following the preceding pig shaped externally to match the shape shown in FIGS. 8 or 9.

The method is applicable to lining pipelines for handling natural gas, water, sewage, oil or chemicals. For gas, water and sewage the pipelines of especial, though not limiting, interest are those in the range 20 mm to 8-inch (204 mm).

Figure 11:
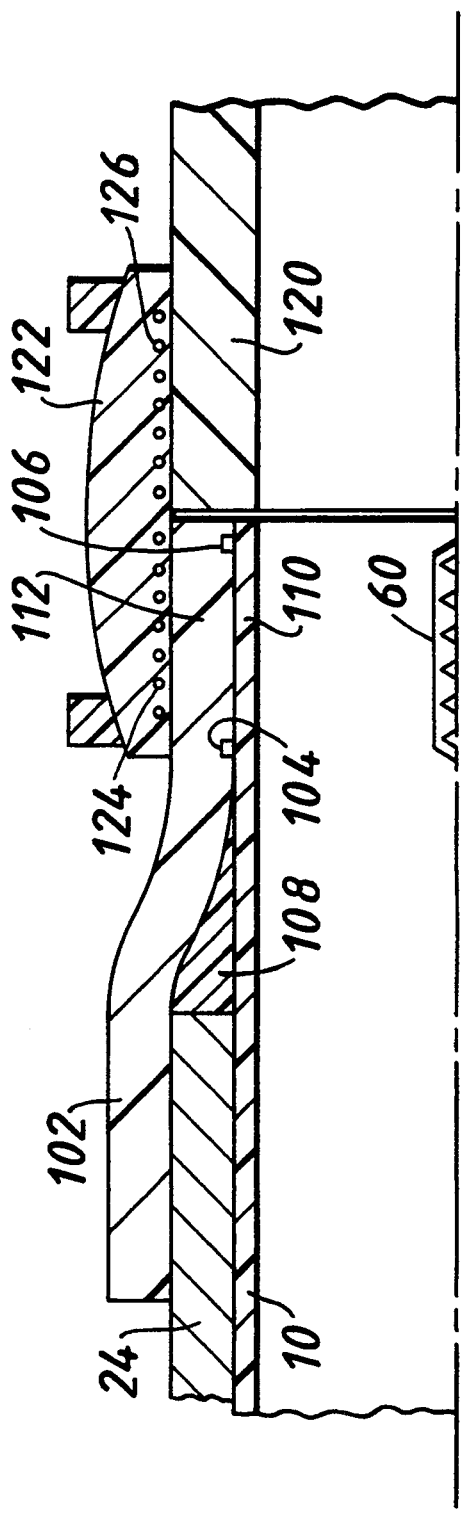
FIGS. 11 and 12 show two examples of a joint between one end of a liner pipe (which has been inserted in a host pipeline) and a further pipe.

FIG. 11 shows one end of a host pipeline 24 which has been lined by a liner pipe 10. The drawing shows a preferred joint between the liner pipe 10 and another pipe 120, which is preferably composed of medium density polyethylene.

A short piece of pipe 102 is expanded at one end so as to fit over the steel host pipeline 24. The other end of the short piece of pipe 102 is a close fit around the protruding end of the liner pipe 10. The piece 102 is preferably composed of medium density polyethylene. For a 110 mm external diameter liner pipe 10, the external diameter of the piece 102, where it fits over the liner pipe 10, is 125 mm.

Two circumferential grooves 104, 106 are machined in the inner surface of the piece 102. An annular wedge-shaped piece 108 of medium density polyethylene is positioned at the end of the host pipeline 24 to act as a support for the piece 102 where it changes diameter.

The lamp 60 is pulled along the pipe 10 until it is opposite the portion 110 and the lamp 60 is switched on. There is sufficient memory left in the pipe 10 for it to continue to revert outwards as it is heated towards its original diameter. At the same time the piece 102 is also heated in the region 112 and a fusion weld is formed between the pipe 10 and the piece 102. The grooves 104, 106 allow flow of the melt in the region of the weld to ensure a satisfactory welded joint is formed.

The two pipes 10 and 102 are next joined to another pipe 120 which lies end-to-end with the pipes 10 and 102. An electrofusion fitting 122 was fitted over the end of the other pipe 120 and the fitting 122 is now moved leftwards as seen in FIG. 11 to straddle the adjacent ends of pipes 102 and 120. The electrofusion fitting 122 is energised by current, which is passed through the windings 124, 126, and the fitting 122 becomes welded to the pipe 102 and to the pipe 120.

The other pipe 120 may be a continuous length of pipeline or it may be a short piece extending from a flange which is part of a joint.

Figure 12:
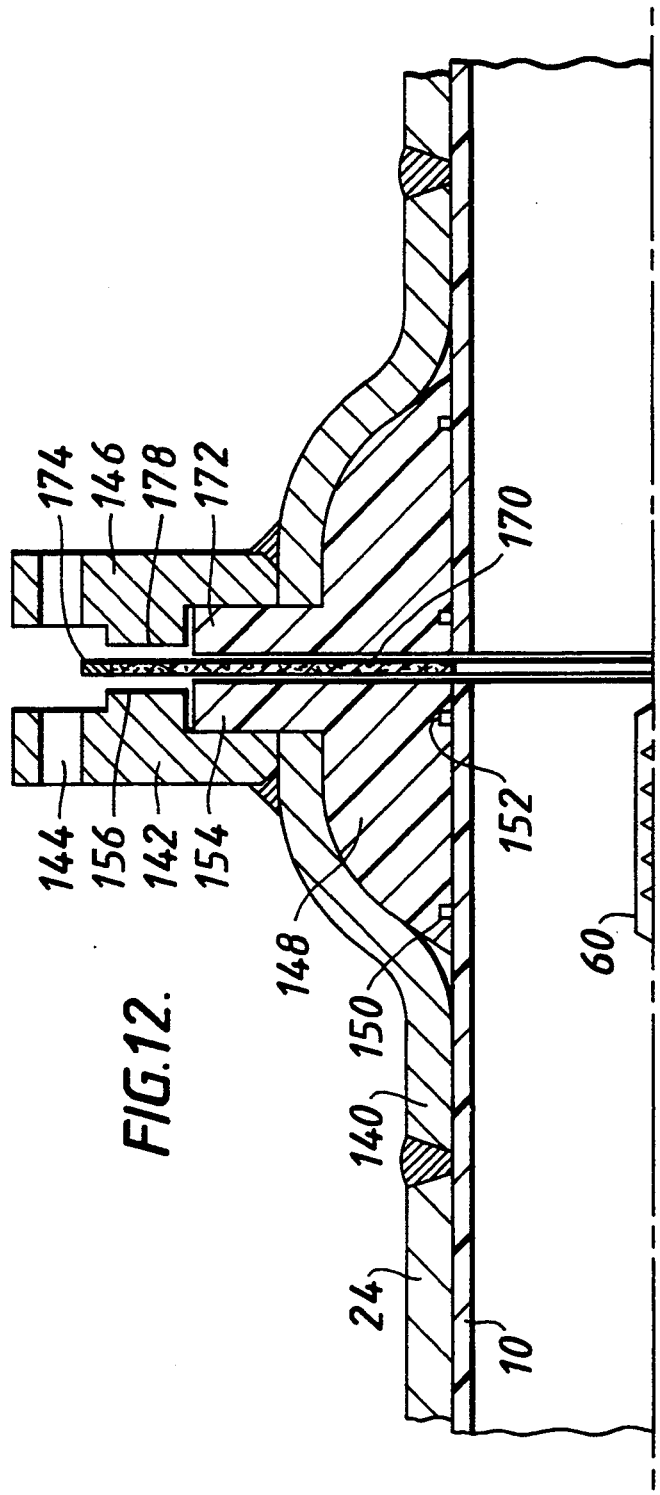

FIG. 12 shows one end of a host pipeline 24 which has been lined with a liner pipe 10 having an end portion protruding from the end of the host pipeline 24. A reducer piece 140 is welded to the end of the host pipeline 24 and the liner pipe 10 protrudes slightly beyond the end of the reducer piece 140. The extreme end of the reducer piece 140 carries a steel flange 142, which is welded to the reducer piece 140, and the flange 142 has holes 144 to receive bolts (not shown) to enable the flange 142 to be secured to another flange 146.

The liner pipe 10 is fusion welded to an annular non-cross-linked medium density polyethylene filler piece 148, which is shaped to occupy most of the space between the interior of the reducer piece 140 and the exterior of the liner pipe 10. The filler piece 148 has two spaced apart, internal grooves 150, 152 which enable the molten melt in the region of the fusion weld to flow which ensures that a satisfactory weld is produced. There is sufficient memory in the liner pipe 10 to enable it to recover and expand when the heater lamp 60 is positioned opposite the region of the weld.

The filler piece 148 has an integral flange 154 which extends radially past the end of the reducer piece 140 and which overlies the inner margin or, the steel flange 142 as far as the inner edge of a land 156.

The thickness of the flange 154 is slightly greater than the thickness, over the land 156, of the steel flange 142.

In securing the steel flange 142 to another flange 146, an annular fibrous gasket 170 is positioned between the flanges 154 and its opposing fellow flange 172. The gasket 170 is bounded by a steel annulus 174 which engages the inner sides of the bolts (not shown) securing the steel flanges 144, 146. The flanges 154, 172 are pulled into tight sealing engagement with the gasket 170 by the bolts securing the steel flanges 144, 146. The land 156 and its fellow land 178 are also pulled into sealing engagement with the gasket 170.

There have just been described, by way of example, two methods of joining the end of a host pipeline 24, which has a liner pipe 10, to another pipeline or another pipeline fitting.

The material used for the liner pipe 10 is preferably cross-linked polyethylene in its natural state. This material is colourless but is not optically clear. Rather it presents an opaque or translucent appearance. However, the material is effectively transparent, or sufficiently transparent, to the visible light from the lamp 60 for the light to reach the wall of the cast iron host pipeline. At the host pipeline the radiation is re-radiated inwardly as heat i.e. as infra-red radiation, the re-radiated radiation being absorbed by the pipe.

Figure 13:
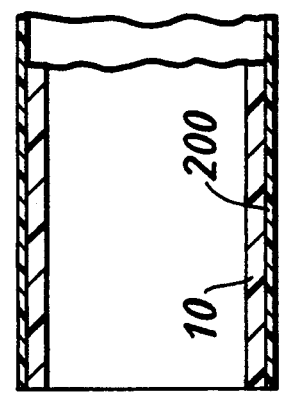
FIG. 13 shows a liner pipe with a sheath of cross-linked polyethylene containing carbon black.

The liner pipe 10 may be used with an outer sheath 200 of cross-linked polyethylene extruded while hot onto the outer surface of the pipe, the outer sheath containing material to act as a heat sink and to re-radiate radiation inwardly back into the liner pipe and preferably being up to 1 mm thick (FIG. 13). The thickness of the sheath 200 shown in the drawing is not shown to scale. The preferred material contained by the sheath 200 is carbon black.

The lamp 60 may itself radiate infra-red radiation instead of visible light.

There are several advantages in using cross-linked material as the liner pipe 10. The material flows around the inwardly protruding plugs inside the host pipeline and produces a smoothly curved shape which assist in the flow of gas through the pipe.

During the welding stage illustrated in FIGS. 11 and 12, the liner pipe 10 develops sufficient outward force to enable a fusion joint to be effectively formed at the encircling polymeric member 102 or 148.

We claim:

1. A method of lining a pipeline having a least inner diameter, comprising the steps of:
    (a) inserting into the pipeline a cross-linked polymeric liner pipe such that a portion of said liner pipe protrudes from an end of said pipeline, wherein said liner pipe has been previously reduced from its original diameter to a lesser diameter or to a shape of reduced maximum radial dimension, said liner pipe having a predisposition by virtue of its memory to revert, upon heating, towards said original diameter, said lesser diameter and said reduced maximum radial dimension being less than the least inner diameter of said pipeline,
    (b) heating said liner pipe with a source of visible or infrared radiation to cause said liner pipe to revert towards said original diameter by moving said source through said liner pipe,
    (c) joining the portion of said liner pipe which protrudes from said pipeline to a tubular annular, non-cross-linked polymeric member having an inner surface and an outer surface and first and second ends, by fusion welding the outer surface of said liner pipe to the inner surface of said first end of said tubular annular member, and positioning said second end of the inner surface of said tubular annular member to surround the outer surface of said pipeline, and (d) joining said tubular annular member to a further pipe or to a pipe fitting by electrofusion coupling said outer surface of said first end of said tubular annular member to said further pipe or to said pipe fitting.

2. A method of lining a pipeline having a least inner diameter one end of said pipeline being welded to a tubular steel reducer piece which comprises a first portion having a first internal diameter substantially equal to the diameter of said pipeline at said one end of said pipeline, said steel reducing piece including a second portion with a second internal diameter, said second internal diameter being larger than said first internal diameter, said second portion of said reducing piece terminating in an annular steel flange, comprising the steps of:

(a) inserting into the pipeline a cross-linked polymeric liner pipe such that a portion of said liner pipe protrudes from said one end of said pipeline and beyond said first portion of said steel reducing piece whereby an annular space is provided between said liner pipe and said second portion of said steel reducing piece, wherein said liner pipe has been previously reduced from its original diameter to a lesser diameter or to a shape of reduced maximum radial dimension, said liner pipe having a predisposition by virtue of its memory to revert, upon heating, towards said original diameter, said lesser diameter and said reduced maximum radial dimension being less than the least inner diameter of said pipeline, (b) providing in said annular space an annular, non-cross-linked polymeric member, said annular polymeric member having a flange which extends radially outwardly and beyond the outer surface of said second portion of said steel reducer piece.

(c) heating said liner pipe with a source of visible or infrared radiation to cause said liner pipe to revert towards said original diameter by moving said source through said liner pipe, (d) fusion welding with said source of visible or infrared radiation, the outer surface of the portion of said liner pipe which protrudes beyond said first portion of said steel reducer piece to the inner surface of said annular polymeric member and (e) joining said pipeline with a second, lined pipeline which also terminates at one end with a steel reducer piece, a steel flange and an annular polymeric member, said second lined pipeline being produced by a method comprising said steps (a)-(d), said joining being effected by locating an annular sealing gasket between the steel flange of said first pipeline and the steel flange of said second pipeline, and bolting the steel flange of said first pipeline to the steel flange of said second pipeline such that said annular sealing gasket is squeezed between the steel flanges.

3. A method according to claim 2, said liner pipe having an outer cross-linked polymeric search which contains material to act as a heat sink and which reradiates radiation inwardly back into said liner pipe.

4. A method according to claim 3, wherein said material which acts as a heat sink and reradiates radiation inwardly back into said liner pipe comprises carbon black.

* * * * *